United States Patent
Bussell et al.

(10) Patent No.: US 8,612,361 B1
(45) Date of Patent: Dec. 17, 2013

(54) SYSTEM AND METHOD FOR HANDLING PAYMENT ERRORS WITH RESPECT TO DELIVERY SERVICES

(75) Inventors: Keith D. Bussell, Los Angeles, CA (US); Geoffrey C. Begen, Lake Forrest, CA (US)

(73) Assignee: Stamps.com Inc., Los Angeles, CA (US)

( * ) Notice: Subject to any disclaimer, the term of this patent is extended or adjusted under 35 U.S.C. 154(b) by 842 days.

(21) Appl. No.: 11/616,546

(22) Filed: Dec. 27, 2006

(51) Int. Cl.
G06Q 30/00 (2012.01)
G06F 17/00 (2006.01)
G07B 17/02 (2006.01)

(52) U.S. Cl.
USPC .......................................... 705/335; 705/401

(58) Field of Classification Search
USPC .............................................. 705/1, 335, 401
See application file for complete search history.

(56) References Cited

U.S. PATENT DOCUMENTS

| | | | | |
|---|---|---|---|---|
| 3,594,727 | A * | 7/1971 | Braun | 235/379 |
| 5,708,422 | A * | 1/1998 | Blonder et al. | 340/5.41 |
| 5,768,132 | A | 6/1998 | Cordery et al. | |
| 6,834,273 | B1 | 12/2004 | Sansone et al. | |
| 2002/0032668 | A1 * | 3/2002 | Kohler et al. | 705/401 |
| 2002/0032784 | A1 * | 3/2002 | Darago et al. | 709/229 |
| 2002/0052841 | A1 * | 5/2002 | Guthrie et al. | 705/40 |
| 2002/0073050 | A1 * | 6/2002 | Gusler et al. | 705/77 |
| 2003/0182155 | A1 * | 9/2003 | Nitzan et al. | 705/1 |
| 2004/0064422 | A1 * | 4/2004 | Leon | 705/401 |
| 2004/0122776 | A1 | 6/2004 | Sansone | |
| 2004/0122779 | A1 * | 6/2004 | Stickler et al. | 705/402 |
| 2004/0128264 | A1 | 7/2004 | Leung et al. | |
| 2004/0186811 | A1 * | 9/2004 | Gullo et al. | 705/402 |
| 2005/0065896 | A1 * | 3/2005 | Kummer et al. | 705/401 |
| 2006/0122947 | A1 * | 6/2006 | Poulin | 705/401 |
| 2006/0259390 | A1 * | 11/2006 | Rosenberger | 705/35 |
| 2007/0033110 | A1 * | 2/2007 | Philipp et al. | 705/26 |
| 2011/0071944 | A1 | 3/2011 | Heiden et al. | |

OTHER PUBLICATIONS

U.S. Appl. No. 09/491,949, Salim G. Kara.
U.S. Appl. No. 10/862,058, Pagel et al.
U.S. Appl. No. 11/353,690, Salim G. Kara.

* cited by examiner

Primary Examiner — Allen J Jung
(74) Attorney, Agent, or Firm — Fulbright & Jaworski LLP

(57) ABSTRACT

Systems and methods which provide processing of payment errors with respect to delivery services in accordance with user preferences are disclosed herein. According to embodiments, a delivery service user provides information with respect to how payment errors with respect to delivery services provided to the user are to be handled to facilitate electronic and/or automated processing of such payment errors. A user may authorize payment shortages on the user's behalf, may request notification for an ad hoc determination as to how the shortage is to be handled, or may elect to have postal items returned in the case of payment shortage. Various levels of payment error handling services may be provided with respect to users. Detailed information, such as statistics with respect to users' payment errors, the numbers and types of payment errors, user's preferences in handling payment errors, etcetera, may be provided.

33 Claims, 2 Drawing Sheets

SYSTEM AND METHOD FOR HANDLING PAYMENT ERRORS WITH RESPECT TO DELIVERY SERVICES

CROSS-REFERENCE TO RELATED APPLICATIONS

The present application is related to U.S. patent application Ser. Nos. 11/353,690 entitled "System and Method for Validating Postage," filed Feb. 14, 2006; 09/491,949 entitled "System and Method for Printing Multiple Postage Indicia," filed Jan. 26, 2000, issued as U.S. Pat. No. 7,343,357 on Mar. 11, 2008; and 10/862,058 entitled "Virtual Security Device," filed Jun. 4, 2004, published as US 2005/0256811 on Nov. 15, 2005; the disclosures of which are hereby incorporated herein by reference.

TECHNICAL FIELD

The present invention is directed generally to providing payment for postal and shipping services, and more particularly to handling payment errors with respect to postal and shipping services.

BACKGROUND OF THE INVENTION

Many postal and shipping services (referred to collectively herein as delivery services) require prepayment for such services, as may be shown through some form of value indicia placed on a letter or parcel. For example, postal services such as the United States Postal Service (USPS) require a stamp, meter stamp, or postage indicia to be affixed to letters and parcels upon their entry into the mail stream in order to show that a requisite amount of value has been paid for their handling and delivery.

Often, either through error or malfeasance, a user of a delivery service may purchase and thus apply an incorrect amount of postage to an item for which delivery services are desired. Such errors in postage typically result in a payment shortage. Allowing such payment shortages to pass unchecked can result in significant losses in revenues for a delivery service such as the USPS. Accordingly, delivery services often have some procedure in place, typically manual, for identifying and handling payment shortages.

The USPS, for example, has implemented a manual procedure for identifying and handling payment shortages. Although the processing of mail and parcels by the USPS is highly automated, payment shortages are primarily identified through manual intervention. For example, as a letter or parcel passes through the mail stream, a postal employee may notice that a container appears unusually large or excessively heavy for the amount of postage applied. This postal item will be physically removed from the mail stream and placed in a bin for providing to a payment shortage processing department for manual processing. The payment shortage processing department will typically weigh, and possibly measure, the postal item to determine the correct amount of postage for the delivery services.

If it is determined that the amount of postage applied constitutes an underpayment, the payment shortage processing department may handle the mail in one of two ways. If the amount of underpayment is not excessive (e.g., less than one-half the proper amount) and the postal item is not part of a mailing from a same sender in which a large number (e.g., ten or more) of postal items have an improper postage amount affixed thereto, the postal item may be marked "postage due" and the requested delivery services performed. In such a situation, it falls upon the recipient to either pay the amount of the underpayment or to refuse delivery of the postal item, in which case the postal item will be returned to the sender where possible. If the amount of underpayment is excessive (e.g., more than one-half the proper amount), the postal item is part of a mailing from the same sender in which a large number (e.g., ten or more) of postal items have an improper postage amount affixed thereto, or there is another reason for refusing to deliver the postal item (e.g., the postal item involves international delivery), the postal item may be returned to the sender or delivery by the delivery service may otherwise be refused.

It can be appreciated from the foregoing that underpayment for delivery services can result in appreciable increased costs for a delivery service provider. For example, manual identification and processing of postal items results in significant per item costs over the typical automated processing provided by such delivery services as the USPS. Moreover, providing for the collection and accounting of postage due payments adds a significant burden to the delivery service's processes. Returning items to a sender incurs appreciable costs by the delivery service provider (perhaps as much as delivering the item to the intended recipient). Moreover, the foregoing processing results in delays in delivery of the item, thereby causing dissatisfaction with senders and receivers alike. However, such processing of payment shortages for delivery services is considered necessary by delivery services in order to discourage chronic or systematic underpayment, which would have significant revenue losses associated therewith.

BRIEF SUMMARY OF THE INVENTION

The present invention is directed to systems and methods which provide processing of payment errors (e.g., underpayments and/or overpayments) with respect to delivery services in accordance with user preferences. According to embodiments of the invention, a delivery service user (e.g., senders and/or recipients of letters or parcels) provides information with respect to how payment errors with respect to delivery services provided to the user are to be handled to facilitate electronic and/or automated processing of such payment errors. For example, a user may authorize payment shortages to be deducted from a postage meter balance associated with the user, may authorize payment of such shortages on the user's behalf for later billing to the user (e.g., monthly post-billing), may request notification of such payment shortage for an ad hoc determination by the user as to how the shortage is to be handled, may elect to have postal items returned to the user in the case of payment shortage. One or more of the foregoing user preferences with respect to handling payment errors may be based upon one or more criteria, such as payment shortages under a particular amount (e.g., payment is authorized for any payment shortage under $1.00), payment overages over a particular amount (e.g., crediting an account is authorized for any payment overage over $1.00), payment shortages totaling less than a particular number per period (e.g., payment is authorized for up to 10 payment shortages per month), payment shortages for particular delivery services (e.g., payment is authorized for first class mail delivery), payment shortages for particular recipients (e.g., payment is authorized for delivery to any address on a list of addresses provided by the user), etcetera.

According to an embodiment of the invention, a user for which processing of payment errors is provided is a user of an information based indicia (IBI) postage indicia system. For example, the user may have a postage account with Stamps.com, the assignee of the present application, for generating and printing postage indicia using a computer based system. Such IBI may be utilized for identifying the user, a postage account associated with the user, a meter number associated with the user, an amount of postage paid, a particular delivery service requested, the type of item to be delivered, any discounts or special pricing applicable to the requested delivery service, address information with respect to the user, address information with respect to the intended recipient, and/or the like. In operation according to an embodiment of the invention, an item bearing the foregoing IBI may be identified as having an error in the payment amount for the particular delivery service requested. The IBI may be scanned, or otherwise read to obtain various desired information. For example, user identification information (e.g., user name, user address, unique meter number, etcetera) and/or user account information (e.g., unique user account number, service provider providing the user metering services, etcetera) may be obtained for electronic processing of the payment error. Scanning of the IBI may take place upon initial acceptance of an item into the mail stream (e.g., acceptance by a postal clerk), during processing of the item for delivery (e.g., during sorting), or at any other time deemed appropriate according to an embodiment of the invention.

Embodiments of the invention operate to determine a user's preferences with respect to handling the payment error. For example, user identification information and/or user account information obtained from an IBI may be associated with a particular service provider, such as Stamps.com, providing payment error handling services for the user. An application programming interface (API), or any other appropriate interface (e.g., web application interface), may be used by the delivery service provider to interact with a payment error handling services provider and/or metering services provider in order to determine the user's preferences in handling the payment error, and perhaps to receive payment for the requested services in order to prevent delay or return of the item.

For example, where the user's preferences indicate payment for an underpayment should be provided, the metering services provider may cause an appropriate amount to be deducted from a metering account associated with the user. Similarly, where the user's preference indicate payment for an underpayment should be provided, the payment error handling services provider may advance an appropriate amount on behalf of the user, for later billing to the user. The foregoing may be provided electronically such that the delivery service provider is provided indication of payment in realtime and thus delay in delivery of the item, as well as processing of the item by the delivery service provider, is minimized. Such payment may include generation of an indicia, such as a supplemental postage indicia, at the delivery service provider's location for application to the item to facilitate further processing of the item.

Where the user's preference is not to pay an underpayment, the metering services provider may notify the user of the underpayment to allow an ad hoc decision as to how to handle the underpayment, which may result in more rapid payment for an appreciable number of items. Additionally or alternatively, where the user's preference is not to pay an underpayment, the metering services provider may notify the delivery service provider to return the item to the user, may request that the delivery service provider deliver the item postage due where possible, etcetera.

Handling of payment errors need not involve a metering services provider according to embodiments of the invention. For example, although a metering services provider may be a preferred provider for such payment error handling services where underpayments are to be funded using a user's metering account, payment services may be provided according to embodiments of the invention by other service providers, particularly where payment advances and post-billing is used. Moreover, payment error handling service providers may additionally or alternatively interface with one or more metering services providers in order to facilitate debiting a user's metering account, where desired. Similarly, a metering services provider may provide payment error handling services with respect to users of another metering services provider, if desired.

The foregoing payment services may be provided to users with a surcharge. For example, in order to avoid delays in delivery of items, possibly including return of the item to the sender and repackaging of the item for a subsequent delivery attempt, users may agree to a fee per item or per service period in order to take advantage of the benefits of embodiments of the present invention.

Various levels of payment error handling services may be provided with respect to users. For example, users agreeing to the aforementioned surcharge may be provided a full complement of payment error handling services, including payment of underpayment amounts in order to avoid delays in delivering items. Whereas, other users may be provided only more basic services, such as providing notification that a payment error has been detected, notification that an item is being returned for a payment error, and/or the like.

Embodiments of the invention provide advantages in addition to the aforementioned minimizing delays in delivering and time for processing items having a payment error associated therewith. For example, detailed information, such as statistics with respect to users' payment errors, the numbers and types of payment errors, user's preferences in handling payment errors, etcetera, may be provided to delivery service providers and/or users according to embodiments of the invention. Using such information, a delivery service provider may deny further services to a user who chronically under pays for delivery services, for example.

It should be appreciated that payment error handling services provided according to embodiments of the invention may not only address underpayment, but may additionally or alternatively address overpayment. For example, although overpayment errors today typically result in the user forfeiting the overpayment amount, efficiencies of operation according to embodiments of the invention with respect to handling underpayment errors may facilitate a quid pro quo wherein amounts of overpayment errors, or some portion thereof, are refunded to a user (e.g., through credit to a meter account, through offsetting a post-payment amount, etcetera).

Payment error handling services may be provided not only with respect to a sender of an item, but such services may additionally or alternatively be provided with respect to a recipient of an item. For example, a recipient may establish preferences with respect to situations in which the recipient would like to authorize payment for an underpayment for delivery of an item to the recipient. Such payment might be debited from the recipient's meter account balance, be billed to the recipient, etcetera. In such an embodiment, the recipient may facilitate delivery of items without delay due to payment errors even where a sender of the item has not elected to participate in a payment error handling service.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
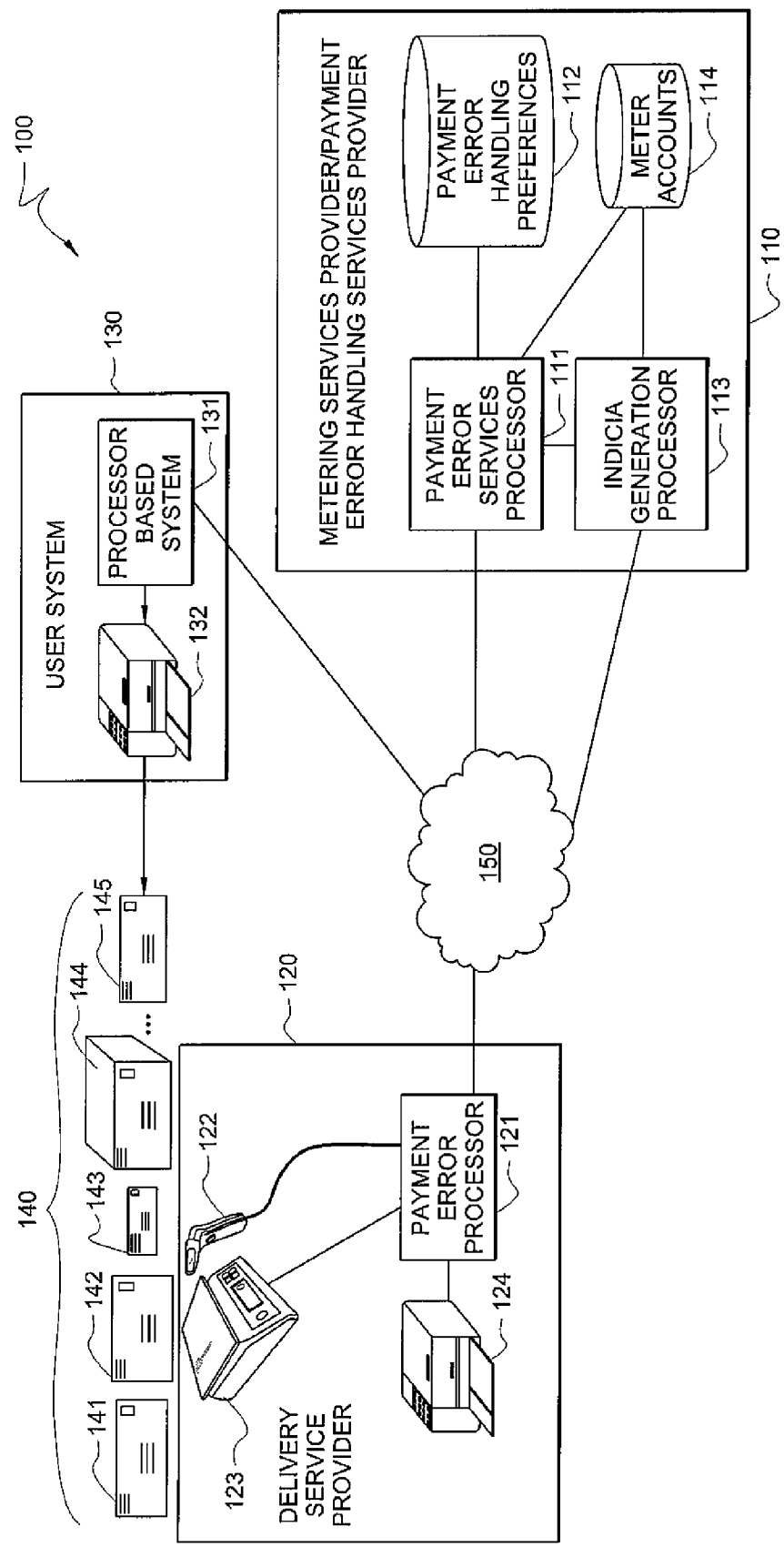
FIG. 1 shows a system adapted to provide payment error handling services according to an embodiment of the invention.

Directing attention to FIG. 1, system 100 adapted to provide handling of payment errors for delivery services according to an embodiment of the present invention is shown. In the illustrated embodiment, user system 130 provides for generation of delivery service indicia, such as may comprise an information based indicia used by the United States Postal Service (USPS) for delivery of mail and parcels. For example, processor-based system 131, such as may comprise a personal computer or other suitable processing platform, is used by a user to generate a delivery service indicia. The delivery service indicia, perhaps in combination with a shipping label or document forming all or part of an item to be delivered, may be printed by printer 132, such as may comprise a laser printer, an ink jet printer, etcetera. Processor-based system 131 may operate independently or in combination with other systems to generate and print the foregoing indicia. For example, processor-based system 131 may communicate via network 150, such as may comprise a local area network (LAN), metropolitan area network (MAN), wide area network (WAN), public switched telephone network (PSTN), an extranet, an intranet, the Internet, and/or the like, to communicate with an indicia generation platform, such as indicia generation processor 113. Details with respect to systems providing generation and printing of indicia for use in authorizing delivery of items is provided in the above referenced patent applications entitled "System and Method for Validating Postage," "System and Method for Printing Multiple Postage Indicia," and "Virtual Security Device."

In the illustrated embodiment, an item bearing the indicia is introduced into mail stream 140. Mail stream 140, shown as comprised of items 141-145, may include items introduced into the mail stream by a variety of different senders and may be bound for any number of different intended recipients. The foregoing items may be of various types, items of different sizes, items of different weights, items for which various services are to be provided, etcetera. Accordingly, various amounts for delivery services may be associated with ones of items 141-145. For example, parcel 144 may incur a delivery service charge which is higher than that associated with flat 142 which is higher than that associated with letter 141. Such delivery service charges may be affected by any or all of the weight of the item, the size of the item, the particular delivery service requested, the location of the sender, the location of the recipient, the contents of the item, the number of items introduced into the mail stream by the sender, etcetera. Accordingly, a user may easily provide an erroneous amount with respect to a delivery service indicia for any particular item. Therefore, the delivery service provider of the illustrated embodiment implements a process for identifying and handling payment errors.

Figure 2:
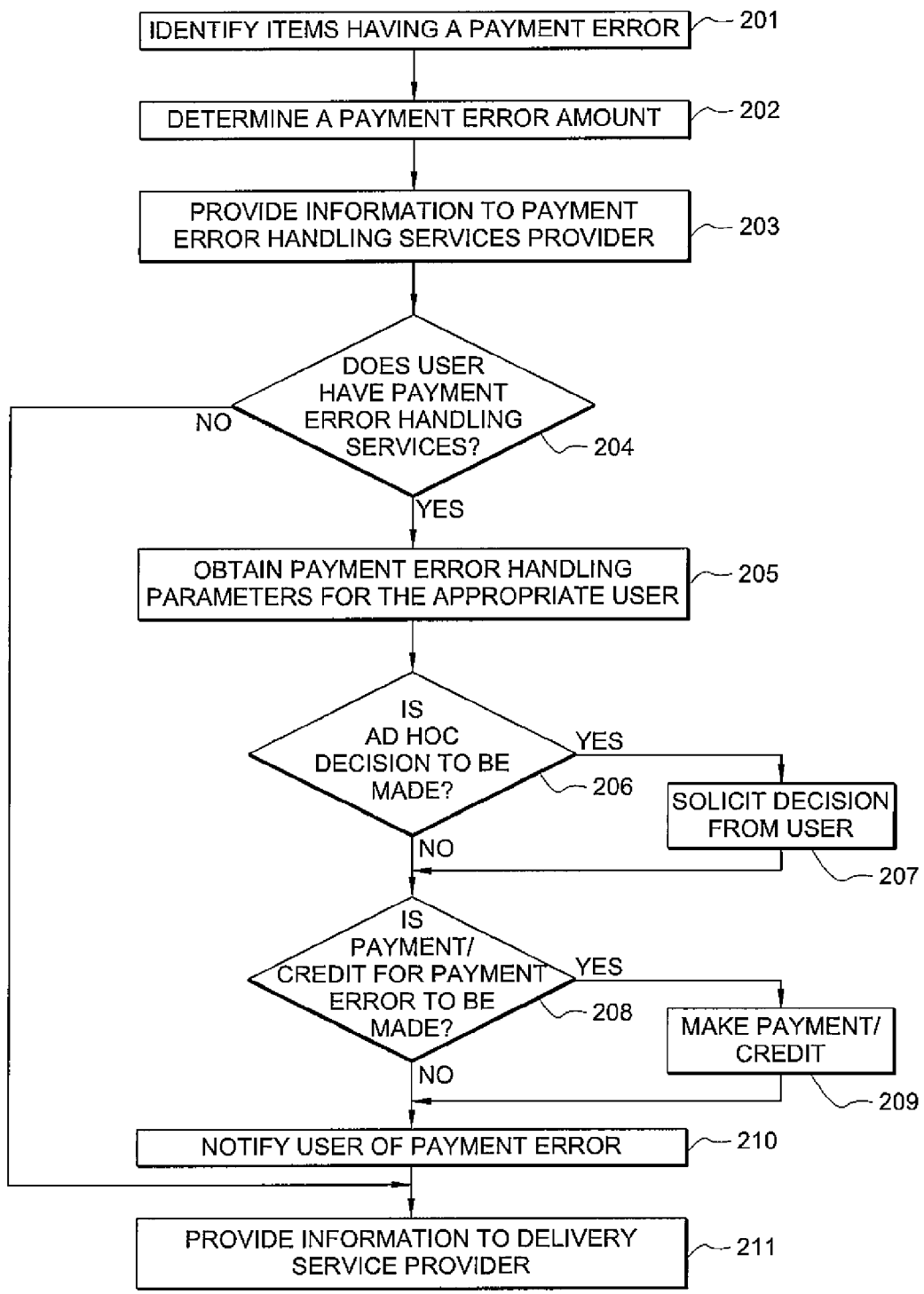
FIG. 2 shows an exemplary flow diagram of operation of the payment error handling services system of FIG. 1.

Directing attention to FIG. 2, an exemplary process for identifying and handling payment errors with respect to delivery services through operation of system 100 of FIG. 1 is shown. At block 201 of the exemplary process, the delivery service provider determines that a payment error has been made with respect to a particular item. For example, flat 142 may be determined to have an insufficient amount of postage affixed thereto. Processing items to determine if an error in payment has been made may occur at various points in the handling of the item. For example, such processing may take place upon initial acceptance of an item into the mail stream (e.g., acceptance by a postal clerk), during processing of the item for delivery (e.g., during sorting), and/or other points in the handling of the item.

A determination that a payment error has been made may be made in a number of ways according to embodiments of the present invention. For example, mail stream 140 may pass through automated mail handling equipment of delivery service provider system 120 in which scale 123 and scanner 122 are disposed. Scanner 122 may comprise an optical scanner adapted to obtain an image of human readable information and convert that information to a form for processing by a processor-based system (e.g., optical character recognition functionality) and/or adapted to more directly read data (e.g., barcode reader, magnetic ink code reader, radio frequency identification reader, etcetera). Thus, scanner 122 may read a value represented by an indicia affixed to flat 142, a type of delivery service requested, information with respect to a location of the sender and/or intended recipient of flat 142, information with respect to the contents of flat 142, etcetera. Correspondingly, scale 123 may determine a weight of flat 142. Information with respect to an item's size may additionally or alternatively be collected. For example, scanner 122 may provide optical processing in order to determine a length, width, and/or height of flat 142. Any or all of the foregoing information may be provided to a processor-based system, such as payment error processor 121, for analysis to determine if a payment error has been made.

Payment error processor 121 of embodiments may comprise a computer system (e.g., an Intel PENTIUM based computer platform) operating under control of an instruction set setting forth operation as described herein. Payment error processor 121 of preferred embodiments analyzes information with respect to an item to determine if a payment error has been made. For example, information with respect to a type of delivery service requested, the weight of item 142, and the size of item 142 may be used to calculate an appropriate amount of payment. This calculated appropriate amount of payment may be compared to the value represented by the indicia affixed to flat 142 to determine if a payment error has occurred.

Although the foregoing embodiment has been described with reference to automated mail handling equipment, it should be appreciated that the concepts of the present invention may be applied to more traditional underpayment detection techniques. For example, flat 142 may be manually separated from mail stream 140 by an employee of the delivery service provider as putatively having a payment error. Flat 142 may later be placed on scale 123 and an indicia thereon scanned using scanner 122 by underpayment processing personnel. Relevant information with respect to flat 142, as discussed above, may be provided to payment error processor 121 for a determination as to whether a payment error has been made.

At block 202 of the illustrated embodiment, a payment error amount is determined. For example, payment error processor 121 may subtract the value represented by the indicia affixed to flat 142 from the calculated appropriate amount of payment to determine a payment error amount.

Although not shown in the illustrated embodiment, a determination may be made with respect to whether the payment error amount is sufficiently large (e.g., meets one or more predetermined threshold value) to warrant further payment error handling processing. For example, if an underpayment is less than a first threshold amount (e.g., $0.01) it may be decided that further payment error handling is undesirable. Similarly, if an overpayment is less than a second threshold amount (e.g., $0.25) it may be decided that further payment error handling is undesirable. According to embodiments of the invention, the foregoing threshold values may be the same, the first threshold may be greater than the second threshold, different threshold amounts may be used with respect to different users, types of services, types of items, etcetera. Moreover, thresholds used for such determinations may not be a predetermined amount, but rather a percentage of an amount (e.g., percentage of the indicia value, percentage of the proper value, or percentage of the payment error). Preferred embodiments of the invention, however, proceed to process all underpayments using the efficiencies of electronic processing as described herein to make such processing practicable.

Information with respect to the payment error is provided to a payment error handling service provider at block 203 of the illustrated embodiment. For example, payment error processor 121 provides information to identify a user or user account and the payment error amount to payment error services processor 111 of metering services provider/payment error handling service provider system 110 via network 150 according to an embodiment of the invention.

Payment error services processor 111 of embodiments may comprise a computer system (e.g., an Intel PENTIUM based computer platform) operating under control of an instruction set setting forth operation as described herein. Payment error services processor 111 of preferred embodiments processes payment error information with respect to an item to determine how the payment error is to be handled and to provide information to payment error processor 121 to facilitate handling of the payment error and associated item by the delivery service provider.

At block 204 a determination is made as to whether a user associated with the item having a payment error has payment error handling services and/or what level of payment error handling services are to be provided. For example, a user of an Internet postage service, such as that available from Stamps.com, may elect to be provided payment error handling services. Accordingly, information provided by payment error processor 121 may be used to identify a user and/or an account and to determine if that user or account has payment error handling services associated therewith. According to embodiments of the invention, database 112 may store information with respect to particular users, accounts, meter numbers, etcetera for which payment error handling services are/are not to be provided. Moreover, the information in database 112 may include a level of payment error handling services to be/not to be provided with respect to such users, accounts, meter numbers, etcetera.

If it is determined at block 204 that payment error handling services are not to be provided, processing according to the illustrated embodiment proceeds to block 211 wherein information is provided to the delivery service provider that payment error handling services are not being provided. For example, payment error services processor 111 may provide data to payment error processor 121 that no payment error handling with respect to the particular item is being provided by the payment error handling services provider and that the delivery service provider should handle the item according to an alternate process (e.g., deliver postage due or return to sender).

Embodiments of the present invention operate to provide a minimum level of payment error handling services even where a user has not elected to receive such services. For example, in addition to providing information to delivery service provider at block 211, embodiments of the invention provide notification to a user of the payment error (block 210) if it is determined at block 204 that payment error handling services are not to be provided.

If, however, it is determined at block 204 that payment error handling services are to be provided, processing according to the illustrated embodiment proceeds to block 205 wherein payment error handling parameters for the appropriate user, account, meter number, etcetera are obtained. For example, database 112 may store information with respect to how payment errors associated with particular users, accounts, meter numbers, etcetera are to be handled. A user may interact with processor-based system 131 to establish desired payment error handling parameters for use by payment error services processor 111, such as through interaction with indicia generation processor 113 and/or payment error services processor 111 to cause appropriate information to be stored in database 112.

Such information may include whether payment for an underpayment is authorized, whether credit for an overpayment is authorized, a maximum amount of payment for an underpayment which is authorized, a maximum number of payments per period for underpayment that are authorized, a total amount of payments per period for underpayment that is authorized, the types of delivery services for which payment for underpayment is authorized, the intended recipients for which payment for underpayment is authorized, the types of items for which payment for underpayment is authorized, etcetera. The information stored in database 112 may additionally or alternatively include whether payment for underpayment or credit for overpayment is to be debited/credited to a particular prepaid account or is to be advanced for postbilling to the user and whether the user is to decide ad hoc (for some or all payment error handling services) how a payment error is to be handled. Such parameters may be utilized by a user to, for example, control a delivery services budget, to avoid depleting an account unexpectedly, or to facilitate completion of particular delivery services without delay while allowing less important delivery services to be handled in a more traditional manner.

At block 206 a determination is made as to whether the user is to make an ad hoc decision with respect to handling the payment error. For example, information with respect to the amount of the payment error, the type of delivery service requested, the intended recipient, the contents of the item, etcetera may be utilized with respect to the foregoing parameters stored in database 112 to determine that the user wishes to make an ad hoc decision for handing the payment error.

If it is determined at block 206 that the user is to make an ad hoc decision for handling the payment error, processing according to the illustrated embodiment proceeds to block 207 wherein a decision is solicited from the user. For example, one or more messages, such as an electronic mail communication, a short message service (SMS) message, an instant message (IM), an interactive voice response (IVR) message, and/or the like, may be directed to the user in an effort to solicit a decision. Preferably, a user is given some limited amount of time (e.g., 24 hours) for a decision before a default payment error handling process is implemented. Accordingly, embodiments of the invention operate to utilize real-time messaging where available. Various information with respect to the item for which a payment error has been made, such as the amount of the payment error, the type of delivery service requested, the intended recipient, the contents of the item, etcetera, may be provided to the user in order to facilitate the ad hoc decision.

A user may, for example, decide that a meter account associated with the user is to be debited for an underpayment, that the payment error handling services provider should advance an underpayment amount and post-bill the user, that no payment of an underpayment is to be made and thus the delivery service provider is to handle the payment error by another process, that an overpayment amount is to be credited to a meter account associated with the user, etcetera. Information indicating the user's ad hoc decision with respect to handing the payment error is preferably provided to payment error services processor 111, such as via an electronic mail communication, a SMS message, an IM, an IVR response, and/or the like. For example, a user may interact with processor-based system 131 to provide information with respect to a payment error handling decision to payment error services processor 111 via network 150.

If, however, it is determined at block 206 that the user is not to make an ad hoc decision for handling the payment error, or after solicitation of an ad hoc decision from the user at block 207, processing according to the illustrated embodiment proceeds to block 208 wherein it is determined as to whether a payment/credit for the payment error is to be made. For example, as mentioned above a user may decide ad hoc that an underpayment is to be paid, whether by debiting an account associated with the user or by advancing payment, by the payment error handling services provider. Similarly, the user's payment error handling preferences, as stored in database 112, may indicate for the circumstances associated with this particular item that an underpayment is to paid by the payment error handling services provider. Accordingly, if it is determined that a payment/credit for the payment error is to be made at block 208, processing according to the illustrated embodiment proceeds to block 209 wherein the payment/credit is made.

If, however, it is determined at block 208 that a payment/credit for the payment error is not to be made at block 208, processing according to the illustrated embodiment proceeds to block 210 wherein the user is notified of the payment error. For example, as mentioned above a user may decide ad hoc that an underpayment is to be handled by means other than payment facilitated through the payment error handling services provider. Similarly, the user's payment error handling preferences, as stored in database 112, may indicate for the circumstances associated with this particular item that an underpayment is to be handled by means other than payment facilitated through the payment error handling services provider. Accordingly, a payment/credit may not be made in response to there being a payment error.

Notification of the payment error and/or how the payment error is being handled is provided to a user at block 210 of the illustrated embodiment. For example, an electronic mail communication, a SMS message, an IM, an IVR message, and/or the like may be provided to the user to provide information with respect to the payment error and how that payment error is being handled by the payment error handling services provider and/or delivery service provider.

At block 211 of the illustrated embodiment, information for facilitating the delivery service provider handling the payment error in accordance with the user's preferences is provided to the delivery service provider. For example, payment error services processor 111 may provide information representing a value transfer in the amount of an underpayment to payment error processor 121 via network 150 on behalf of the user in order to facilitate delivery of flat 142 without further delay. Alternatively, payment error services processor 111 may provide information instructing payment error processor 121 to process flat 142 according to a default payment error handling process via network 150 where the user prefers not to have the payment error handling services provider make payment on behalf of the user.

According to embodiments of the invention, payment error services processor interacts with indicia generation processor 113 to cause a supplemental value indicia, in an amount of an underpayment for delivery services, to be generated and transmitted to payment error processor 121. Payment error processor 121 may cause the supplemental value indicia to be applied to flat 142, such as by printing the indicia at printer 124. Accordingly, further processing of flat 142 by the delivery service provider may be without additional delay due to the previous payment error.

Additionally or alternatively, payment error processor 121 may provide information to other systems of the delivery service provider in order to avoid subsequent processing of item 142 due to the previously identified payment error.

Although not shown in the exemplary process of FIG. 2, embodiments of the invention may operate to compile statistical information with respect to payment errors. For example, information with respect to users' payment errors, the numbers and types of payment errors, user's preferences in handling payment errors, etcetera, may be compiled for providing to delivery service providers and/or users according to embodiments of the invention. A delivery service provider may use such information to deny further services to a user who chronically under pays for delivery services, until such user has taken steps to address the situation.

Although the embodiment illustrated in FIG. 1 shows a same service provider providing both metering services and payment error handling services, it should be appreciated that such services may be separately provided according to embodiments of the invention. For example, a payment error services provider may provide payment error services with respect to payment errors associated with users of various different metering services, whether or not the payment error services provider itself also provides metering services.

Payment error handling services may be provided not only with respect to a sender of an item, but such services may additionally or alternatively be provided with respect to a recipient of an item. For example, steps of the process of FIG. 2 may be performed with respect to a sender to determine if payment error handling services are to be provided with respect to a sender of the item. If such services are not to be provided with respect to the sender, steps of the process may be performed with respect to an intended recipient to determine if payment error handling services are to be provided with respect to a recipient of the item. Similar to a sender, a recipient may establish preferences with respect to situations in which the recipient would like to authorize payment for an underpayment for delivery of an item to the recipient. Such payment might be debited from the recipient's meter account balance, be billed to the recipient, etcetera. In such an embodiment, the recipient may facilitate delivery of items without delay due to payment errors even where a sender of the item has not elected to participate in a payment error handling service.

A service surcharge may be assessed by a payment error handling services provider providing payment error handling services according to embodiments of the invention. For example, in addition to the amount of an underpayment, the payment error handling services provider may collect an additional amount (e.g., a predetermined amount, an amount based upon the type of delivery service, an amount based upon the charges for the delivery service, an amount based upon a level of payment error handling services provided, etcetera) from users for the payment error handling service. According to embodiments of the invention, such surcharges may be deducted from a meter account along with an underpayment amount. Similarly, such surcharges may be deducted from a credit to be made to a meter account in association with an overpayment. Of course, various techniques for collecting such surcharges may be implemented, such as prepayment, post-payment, billing separate from debiting/crediting amounts to a metering account, etcetera.

It should be appreciated that, although embodiments have been described herein with reference to handling payment errors, embodiments of the present invention may be utilized to provide for handling payment for services which are not associated with a payment error. For example, the systems and methods described herein may be utilized to facilitate a postage metering process which deducts or otherwise commits postage value only with respect to postal items actually processed by the postal authority. Accordingly, refunds for misprinted postage indicia may be avoided. Likewise, postage indicia which is generated, but never used, does not result in forfeiture of postage value according to embodiments of the invention.

In operation according to an embodiment of the invention, a non-funded or partially funded postage indicium (referred to herein as an "unfunded postage indicium") is generated by a user. This unfunded funded postage indicium preferably appears to be a typical postage indicium (such as the aforementioned IBI), but the full value of postage value for payment of delivery services has not been committed (e.g., a meter descending register has not been decremented in the full amount of postage to be used for delivery of an item) at generation of the unfunded postage indicium. The unfunded postage indicium preferably includes information identifying a user, a meter, an account, etcetera for identifying an appropriate user or account from which payment for postage is to be obtained, as described above. Thereafter, when the item associated with the unfunded postage indicium is handled, the unfunded postage indicium may be scanned or otherwise read, such as by scanner 122, a payment processor, such as that of payment error processor 121 described above, may operate to provide for payment, or full payment, for the postage.

The foregoing embodiment, providing for payment of postage when an associated item is handled, ensures that only postage for items which are actually handled for delivery is paid by a user. Accordingly, if a unfunded postage indicium fails to print properly or otherwise remains unused, the user need not take any steps for obtaining a refund. Moreover, users may pay only for postage actually needed, at the time of use, rather than pre-paying for an amount of postage which is expected to be used in the future, as is the case with typical postage metering paradigms.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   determining, during processing of an item for delivery by a delivery service provider, a payment error amount with respect to a payment for delivery of said item;
   providing said payment error amount to a payment error handling computer system of a payment handling entity;
   obtaining, by said payment error handling computer system, predefined user payment error preferences with respect to handling delivery payment errors for a user associated with said item, wherein said predefined user payment error preferences define how said payment error is to be handled by said delivery service provider during said processing, said predefined user payment error preferences include information as to whether or not an ad hoc decision must be made by said user with respect to the handling of the payment errors, and wherein said predefined user payment error preferences were defined by said user to handle the payment errors;
   providing, by said payment error handling computer system, information with respect to handling said payment error in accordance with said predefined user payment error preferences to said delivery service provider; and
   handling, by said payment handling computer system, said payment error during processing of said item by said delivery service provider in accordance with said user payment error preferences.

2. The method of claim 1, wherein said payment error comprises an underpayment for delivery of said item.

3. The method of claim 1, wherein said payment error comprises an overpayment for delivery of said item.

4. The method of claim 1, wherein said predefined user payment error preferences comprises information with respect to sending a message to said user to solicit said ad hoc decision.

5. The method of claim 1, wherein said predefined user payment error preferences include a preference for payment of said payment error amount, and wherein said preference for payment of said payment error amount comprises an authorization to debit an account associated with said user.

6. The method of claim 1, wherein said predefined user payment error preferences include a preference for payment of said payment error amount, and wherein said preference for payment of said payment error amount comprises an authorization to advance said payment error amount, by another, on behalf of said user.

7. The method of claim 1, wherein said information with respect to handling said payment error comprises an indication of payment of said payment error.

8. The method of claim 7, wherein said indication of payment comprises information for printing a payment indicia, by said delivery service provider, for said item.

9. The method of claim 1, further comprising:
notifying, by a payment error handling services provider, said user of said payment error.

10. The method of claim 1, wherein said determining said payment error comprises:
scanning an information based indicia associated with said item.

11. The method of claim 1, wherein said payment error handling computer system also provides metering services to said user.

12. The method of claim 1, wherein said delivery service provider is a postal service provider.

13. The method of claim 1, further comprising:
charging, by a payment error handling services provider, a fee to a user associated with said predefined user payment error preferences for said handling the payment error.

14. The method of claim 1, wherein said predefined user payment error preferences are established by an intended recipient of said item.

15. The method of claim 1, wherein said predefined user payment error preferences comprise an authorization to advance said payment error amount, by another, on behalf of said user.

16. The method of claim 1 further comprising:
determining whether said payment error breaches a threshold wherein said handling said payment error is in accordance with said predefined user payment error preferences and said threshold breach determination.

17. The method of claim 1 further comprising:
compiling a payment error history; and
overriding said predefined user payment error preferences to handle said payment error in accordance with said payment error history rather than said user payment error preferences.

18. The method of claim 13 wherein said payment error handling service provider provides varying levels of payment error handling services comprising a plurality of payment error handling options, and wherein said fee is determined based on which options are available in a particular level.

19. A system comprising:
a payment error processor configured to collect information with respect to payment errors for delivery of items being processed for delivery; and
a payment error services processor in information communication with said payment error processor and configured to receive said information with respect to payment errors and to access predefined user payment error preference information, wherein said predefined user payment error preference information defines at least one payment error handling protocol for a user, wherein said payment error services processor provides information, based on the user payment error preference information, to said payment error processor to facilitate handling of said payment errors during processing of the items by a delivery service provider in accordance with the user payment error preference information, the user payment error preference information includes an indication of whether or not an ad hoc decision must be made by said user with respect to handling of the payment errors and wherein said user payment error preference information is based at least in part on a user's choice that was input specifically to define how to handle said payment errors.

20. The system of claim 19, further comprising:
a database in communication with said payment error services processor, said database storing said predefined user payment error preference information.

21. The system of claim 20, wherein said predefined user payment error preference information comprises:
a metering account for debiting a payment error in the form of an underpayment.

22. The system of claim 20, wherein said predefined user payment error preference information comprises:
a maximum amount per item for payment on behalf of an associated user of a payment error in the form of an underpayment.

23. The system of claim 20, wherein said predefined user payment error preference information comprises:
a maximum number of items per a preselected period for payment on behalf of an associated user of a payment error in the form of an underpayment.

24. The system of claim 20, wherein said predefined user payment error preference information comprises:
a type of delivery service for payment on behalf of an associated user of a payment error in the form of an underpayment.

25. The system of claim 20, wherein said predefined user payment error preference information comprises:
a type of item for payment on behalf of an associated user of a payment error in the form of an underpayment.

26. The system of claim 20, wherein said predefined user payment error preference information comprises:
preferences, established by an intended recipient of an item, for handling a payment error.

27. The system of claim 19, further comprising:
a plurality of meter accounts associated with users of said delivery service provider, wherein based on the predefined user payment error preference information, value is debited from an appropriate one of said meter accounts.

28. The system of claim 19, wherein the predefined user payment error preference information comprises an indication of transfer of value from a payment error services provider associated with said payment error services processor to said delivery service provider.

29. The system of claim 19, further comprising:
a scanner coupled to said payment error processor for providing at least a portion of said information with respect to payment errors.

30. The system of claim 19, further comprising:
a scale coupled to said payment error processor for providing at least a portion of said information with respect to payment errors.

31. The system of claim 19, further comprising:
an indicia generation processor in communication with at least one of said payment error processor and said payment error services processor and providing information for printing an indicia of payment of said payment error for a particular item.

32. The system of claim 19, wherein said information collected by said payment error computer system includes a value of said payment error and wherein said payment error service computer system operates only when said payment error value exceeds a threshold value.

33. The system of claim 19, wherein said collected information is compiled into a payment error history such that said delivery service provider overrides said predefined user payment error preferences and determines how to handle said payment error based on said payment error history instead of handling said payment error based on said user payment error preferences.

* * * * *